(12) United States Patent
Wagner et al.

(10) Patent No.: US 6,452,639 B1
(45) Date of Patent: Sep. 17, 2002

(54) RASTER SCAN CONVERSION SYSTEM FOR INTERPOLATING INTERLACED SIGNALS

(75) Inventors: Peter Wagner, Waiblingen; Joerg Schwendowius, Stuttgart; Klaus Zimmermann, Stuttgart; Oliver Erdler, Stuttgart, all of (DE)

(73) Assignee: Sony International (Europe) GmbH, Berlin (DE)

(*) Notice: Subject to any disclaimer, the term of this patent is extended or adjusted under 35 U.S.C. 154(b) by 0 days.

(21) Appl. No.: 09/262,728

(22) Filed: Mar. 4, 1999

(30) Foreign Application Priority Data

Mar. 9, 1998 (EP) .............................. 98104196

(51) Int. Cl.$^7$ .................................. H04N 7/01
(52) U.S. Cl. ...................... 348/448; 348/441; 348/451; 348/452; 382/300
(58) Field of Search ................. 348/448, 441, 348/451, 452, 911, 458, 459, 445; 382/300; 345/606; H04N 7/01

(56) References Cited

U.S. PATENT DOCUMENTS

| | | | | |
|---|---|---|---|---|
| 5,483,288 A | * | 1/1996 | Hong | 348/448 |
| 5,493,338 A | | 2/1996 | Hong | 348/441 |
| 5,943,099 A | * | 8/1999 | Kim | 348/448 |
| 5,953,465 A | * | 9/1999 | Saotome | 382/300 |
| 5,991,464 A | * | 11/1999 | Hsu et al. | 348/458 |
| 6,141,056 A | * | 9/2000 | Westerman | 348/448 |
| 6,157,749 A | * | 12/2000 | Miyake | 382/300 |
| 6,262,773 B1 | * | 7/2001 | Westerman | 348/448 |

FOREIGN PATENT DOCUMENTS

| | | |
|---|---|---|
| EP | 0 387 048 A2 | 9/1990 |
| EP | 0 629 083 A1 | 12/1994 |
| EP | 0 687 105 A2 | 12/1995 |

OTHER PUBLICATIONS

Karlsson M et al:"Evaluation of Scanning Rate Up Conversion Algorithms;Subjective Testing of Interlaced to Progressive Conversion"IEEE Transactions on Consumer Electronics, vol. 38, No. 3, Aug. 1992, pp. 162–167, XP000311831.

Pasi Pohjala et al: "Line Rate Upconversion in IDTV Applications"Proceeding of the International Conference on Consumer Electronics (ICCE), Rosemont, Jun. 5–7, 1991, no. CONF. 10, Jun. 5, 1991, Institute of Electrical and Electronics Engineers, pp. 250–251, XP000289024.

* cited by examiner

Primary Examiner—John Miller
Assistant Examiner—Jean W. Désir
(74) Attorney, Agent, or Firm—Frommer Lawrence & Haug LLP; William S. Frommer; Darren M. Simon

(57) ABSTRACT

The invention relates to an interlaced to progressive conversion method and system by use of an interpolation algorithm (IPC algorithm) which is scaleable with several levels or modes with an increasing computational complexity depending on increasing availability of resources, i.e. computation power, available memory and available memory bandwidth. An IPC mode control can be implemented as a decision table. Peferably, at least five levels of the algorithm can be scaled beginning with line repetition (lowest level), linear interpolation (lower level), median inter-field computation with a three-tap or a five-tap median operator (medium level) and a combination of a linear interpolator and a median interpolator, eventually in combination with edge detection (higher levels of the scaleable algorithm).

13 Claims, 8 Drawing Sheets

| IPC module mode | Memory available | CPU performance | Memory bandwidth lines Input per single line Output |
|---|---|---|---|
| Line doubling | No field no line mem | No computation | 1 in |
| Linear interpolation | 1 linemem | Pixel averaging | 2in |
| 3tap median predecessor | 1 fieldmem + 2 linemem | 3tap median | 3in |
| 3tap median successor | 1 fieldmem + 2 linemem | 3tap median | 3in |
| 5tap median | 2 fieldmem + 3 linemem | 5tap median + pixel averaging | 4in |
| 5tap median with edge processing | 2+ fieldmem + 3 linemem + ? | 5tap median + pixel averaging + edge detection | ? |
| No processing int in – int out | – | – | – |

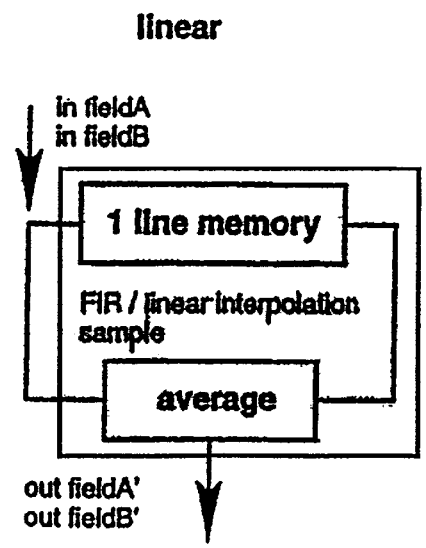

FIG. 2

| field A | field B | field C | field D |
|---|---|---|---|
| 1 | 2 | 1  A | 2 |
| 3 | 4 | 3 | 4 |
| 5 | 6 | 5 | 6 |
| 7 | 8  B | 7 | 8 |
| 9 to be delayed | 10 | 9 | 10 |
| 11 | 12 | 11 | 12 |
| 13 | 14 | 13 | 14 |
| 15 | 16  C | 15 | 16 |
| 17 | 18 | 17 | 18 |
| 19  D | 20 | 19 | 20 |
| 21 | 22 to be delayed | 21 | 22 |
| 23 | 24 | 23 | 24 |
| 25 | 26 | 25 | 26 |
| 27 | 28 to be delayed | 27  E | 28 to be delayed |
| 29 | 30 | 29 | 30 |
| 31 | 32  F | 31 | 32 |
| 33 | 34 | 33 | 34 | field lines are shown alligned as they come out of the field memories shaded areas are filter apertures this graphic shows the respective delay for incomming source lines A: 3tapmed predecessor odd field comes in B: 3tapmed predecessor even field comes in C: 3tapmed successor odd field comes in D: 3tapmed successor even field comes in E: 5tapmed vertical odd field comes in F: 5tapmed vertical even field comes in

| = field to be interpolated "cebter of gravity"

▨ = source lines needed for IPC filter processing

FIG. 8

Function:

MEDIAN (a, b, c, d, e) =

MAX{ MIN[MIN(a,W);MAX(X,Y)] ; MAX[MIN(X;Y);Z] }

W = MAX{ b ; MAX[c;MAX(d;e)] }

X = MIN{ b ; MAX[c;MAX(d;e)] }

Y = MAX{ MIN[c;MAX(d,e)] ; MIN(d;e) }

Z = MIN{ MIN[c;MAX(d,e)] ; MIN(d;e)}

Assumption:
FIR = 0.5 * (Top + Bot.)

Function:

MEDIAN = MAX{ MIN(W,X) ; MAX(Y,Z)}

W = MIN{ Succ. ; MAX[Prev.;MAX(Top, Bot.)]}

X = MAX{ MIN[P; MAX(Top;Bot.)] ; FIR}

Y = MIN{ MIN[Prev.;MAX(Top;Bot.)] ; FIR}

Z = MIN{ Top ; Bot. }

RASTER SCAN CONVERSION SYSTEM FOR INTERPOLATING INTERLACED SIGNALS

The invention relates to a method and a system for an adaptable scan raster conversion of an interlaced source signal into a progressive output signal by use of a signal interpolation algorithm (IPC algorithm).

Interlaced to progressive conversion interpolation algorithms interpolate missing lines in an interlaced scanned source field in order to create a progressive frame. Interlaced scanning is a spatio-temporal sub-sampling scheme, i.e. vertical sub-sampling in the spatial dimension. This sampling raster combines the advantages of a high temporal sampling frequency, i.e. high field rate, with the advantages of a low spatial sampling rate with a moderate bandwidth or data rate.

For progressive display media, e.g. computer monitors, LDC displays, etc., the problem is, to display an "interlaced signal" in a progressive fashion. Before this can be done, a formate conversion or scan raster conversion has to be performed, which transforms the signal from interlaced to progressive form (IPC). Since interlaced scanning is a spatio-temporal sub-sampling as mentioned, a spatio-temporal interpolation scheme has to be applied in order to achieve the best possible results.

IPC algorithms can be coarsely divided into three algorithm classes. This classification is based on the most critical and characteristic source signal, i.e. image motion. The classes are:

- static, i.e. no motion information whatsoever;
- motion adaptive, i.e. a motion detector with some ON/OFF selection is required;
- motion compensated, i.e. it includes motion vector information.

Static algorithms are basically motion-insensitive. i.e., time-invariant filter schemes and lack a distinct motion detector or motion vector estimator. Examples are:

- line repetition,
- linear line interpolation, i.e. one-, two- or three-dimensional FIR filters with a fixed spatio-temporal filter aperture, and
- non-linear median filters, i.e. one-, two- or three-dimensional filters.

Due to the simplicity of these algorithm classes, the filters have a relatively simple implementation, but their visual performance is potentially limited in comparison to motion adaptive or motion compensated algorithms. A good spatio temperal behaviour of an IPC algorithm, according to the state of the art knowledge, is only achievable with a motion vector estimation.

Motion adaptive algorithms feature a motion detector component, which performs soft- or hard-switching between mere spatial interpolation or a spatio/temporal interpolation, i.e. filter mask selection. The switching scheme includes thresholds and defined switching method. In other words, a motion signaling switches between spatial and spatio-temporal interpolation, i.e. the filter mask selection switching between vertical and temporal interpolation, and the motion signal is detected on a frame or field basis. A variety of motion detectors are proposed in the literature and reference is made to the literature list attached to this description.

However, a motion detector estimation is a computationally expensive task.

It is an object of the invention to provide a new and improved method and system for a scan raster conversion of an interlaced source signal into a progressive output signal with good visual results but with low computational efforts.

An implementation related problem is the availability of system resources which can be used for the IPC algorithm. In a complex image processing system, which serves multiple purposes, resource availability is often a time-variant function. This problem is approached with the invention by use of a scaleable IPC algorithm which—depending on the available resources at a certain time—yields the best possible interpolation result.

Based on this background from the above, the IPC problem is solved by the invention by an IPC algorithm wich converts an interlaced source signal into a progressive output signal with computational costs limited to a minimum by use of only static but scaleable IPC algorithm depending on the time-variant availability of system resources.

According to the invention, a method for an adaptable scan raster conversion of an interlaced source signal into a progressive output signal by use of a signal interpolation algorithm (IPC algorithm) is proposed which is scaleable in terms of various modes depending on the availability of the respective system resources and/or external constrains at a certain time.

Said system resources may comprise an alternatively scaleable IPC system with respectively associated alternative processing modules and/or module resources, respectively selectable depending on a grouped selection by an IPC mode control. Such system resources and/or external constrains may be computational power, available memory capacity, available memory bandwidth. Preferably, said interpolation algorithm in respect to each selectable mode is of a linear filter type and/or a median type and/or a combination of a linear interpolation, e.g. FIR filtering and a median filtering.

A scan raster conversion system for converting an interlaced source signal into a progressive output signal by use of a signal interpolation algorithm (IPC algorithm) comprises according to the invention

- various modules for signal interpolation, and
- an IPC mode control means provided with knowledge about required resources for specific classes of interpolation processes and receiving input information about available resources of an embracing system at a certain time for supplying command structures for a mode specific selection of one or a combined plurality of said interpolation modules dependent on said input information.

According to a preferred embodiment, said various modules for signal interpolation comprise at least one linear interpolator and a ranking filter interpolator.

The various signal interpolation modules are based on the one hand on linear algorithms that can be divided into source signal insensitive algorithms, such as the above mentioned linear filters, and in non linear signal adaptive algorithms, such as

- median filters,
- weighted median filters,
- vertical and/or diagonal edge adaptive interpolators, including edge adaptive median filters, and
- filters that adapt to the spatial slope of lines.

This last mentioned third class is the most elaborate interpolation scheme and offers the possibility of maintaining high spatial resolutions and thus a high visual quality of the interpolation results, i.e. of the progressive frame with minimal aliasing with a variety of motion speeds.

An alternative class of algorithms, the motion compensated algorithms, features a variety of components, i.e.:

motion vectors estimation on a frame or field basis, motion vectors are computed for a variety of block sizes (spatial granularity) which can be as small as a single pixel, i.e. a motion vector for each source pixel, motion vector precision can vary and can be as detailed as on a sub-pixel basis, the interpolation scheme, which estimates the missing pixels in an interlaced source field incorporates this motion vector information to enhance a visual quality of a resulting progressive image.

A variety of motion estimators has been proposed such as block search, recursive block search/block matching, phase correlation black matching, schemes to adapt MPEG motion vectors in order to use them for IPC.

The algorithm structure or architecture according to the invention is adaptive depending on the current resource setting or availability. This algorithm in its various modes belongs to the static interpolator type in consideration of implementation restrictions such as CPU power and memory. In its advanced mode, it is the mixture of a linear filtering, i.e. linear interpolation part, and edge adaptive median filtering, implemented in three-tap and five-tap median processor part.

Whereas the sope of the present invention shall be determined by the terms of the claims to be interpreted by the description in consideration of the knowledge of the expert in this field, in the following various implementation examples of the invention are described with reference to the accompanying drawings in which FIG. 1 is an example for a look-up-table for an IPC mode control for adaptation of the algorithm mode in consideration of the available resources;

FIG. 2 is a block scheme of a linear IPC interpolation module, e.g. a linear filter requiring a one-line-memory and a pixel averaging computation;

FIG. 8 is a field scheme showing line delays, filter apertures and field interpolation as well as IPC filter synchronization for three different modes of the IPC algorithm, i.e. for cases that an odd field comes in and for the cases that an even field comes in, respectively;

Referring first to the line delays for IPC filter synchronization as depicted in FIG. 8, an incoming source signal is scanned in the interlaced raster. The output is a progressive frame when the same original incoming source field is interleaved with interpolated lines to generate said progressive frame.

Let's denote the incoming fields A, B, C, D, . . . with A, C, . . . being fields in the odd field raster position, and B, D, . . . being in the even field raster position. The respective missing fields, i.e. fields which have to be interpolated are called A', B', C', D' . . . with A', C', . . . being the respective even field raster positions, and B', D', . . . referring to the respective odd field raster positions. A progressive frame is combined of interleaved fields (A+A'), (B'+B), . . . , (X+X'), or (X'+X). If as sometimes used the source fields are referred to as X and the interpolated fields are denominated by X'. The proposed IPC system according to the invention contains an algorithm which consists of two major components, i.e.

linear interpolation; this part will be referred to as "linear part", and ranking order interpolation; this part will be referred to as "median part".

In its basic form, a linear interpolation refers to a simple linear filter for averaging of two successive lines in a source field; four or more tap linear filters are possible.

A ranking order filter interpolation in connection with the present invention refers to a median type filter having three-taps or five-taps.

Even though not specifically emphasized additional components could possibly be integrated in the multimode IPC algorithm, namely a bypass functionality in case an interlaced scanned signal is the targeted output. This mode (see first line of FIG. 1) could become a requirement for a flexible hardware solution.

Figure 3:
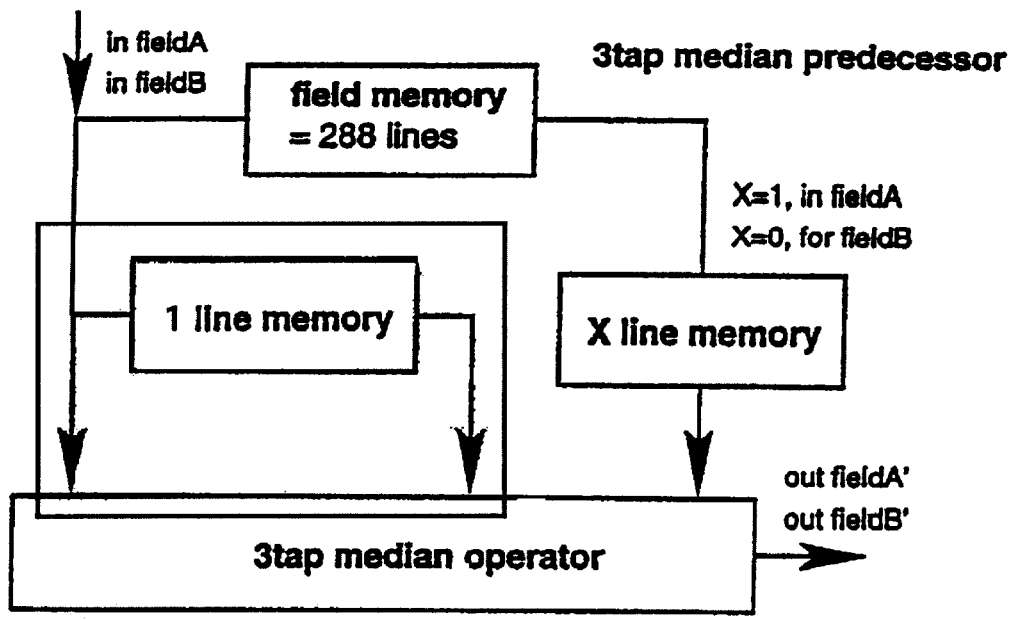
FIG. 3 is a functional block scheme of a higher mode IPC module comprising a three-tap median predecessor operator, one field and two line memories.
Figure 4:
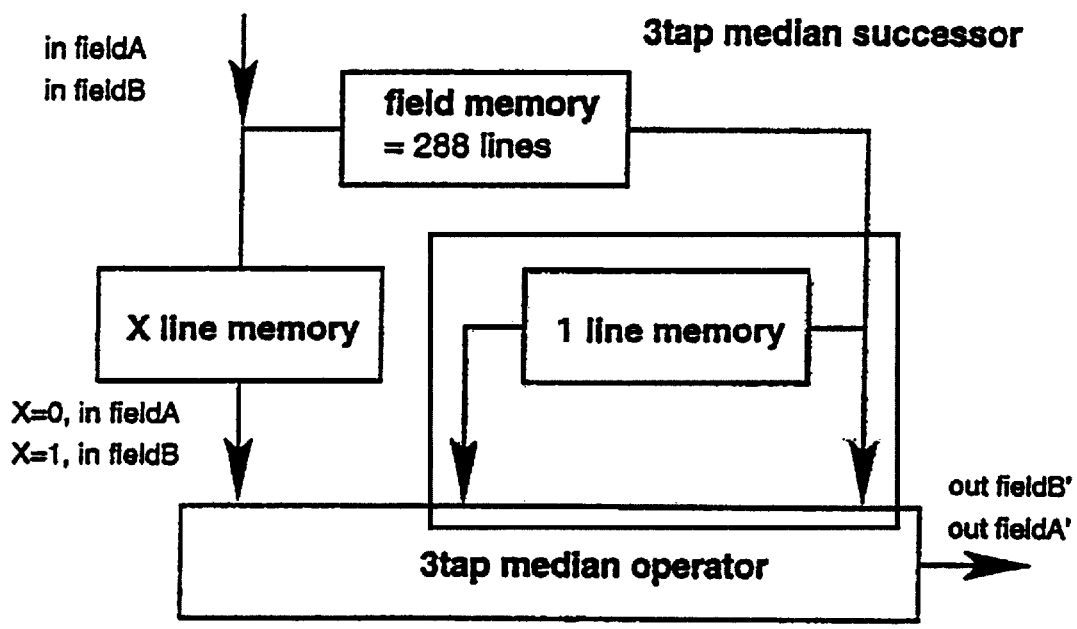
FIG. 4 depicts a functionality scheme of a higher mode IPC module comprising a three-tap median successor operator, one field and two line memories.
Figure 5:
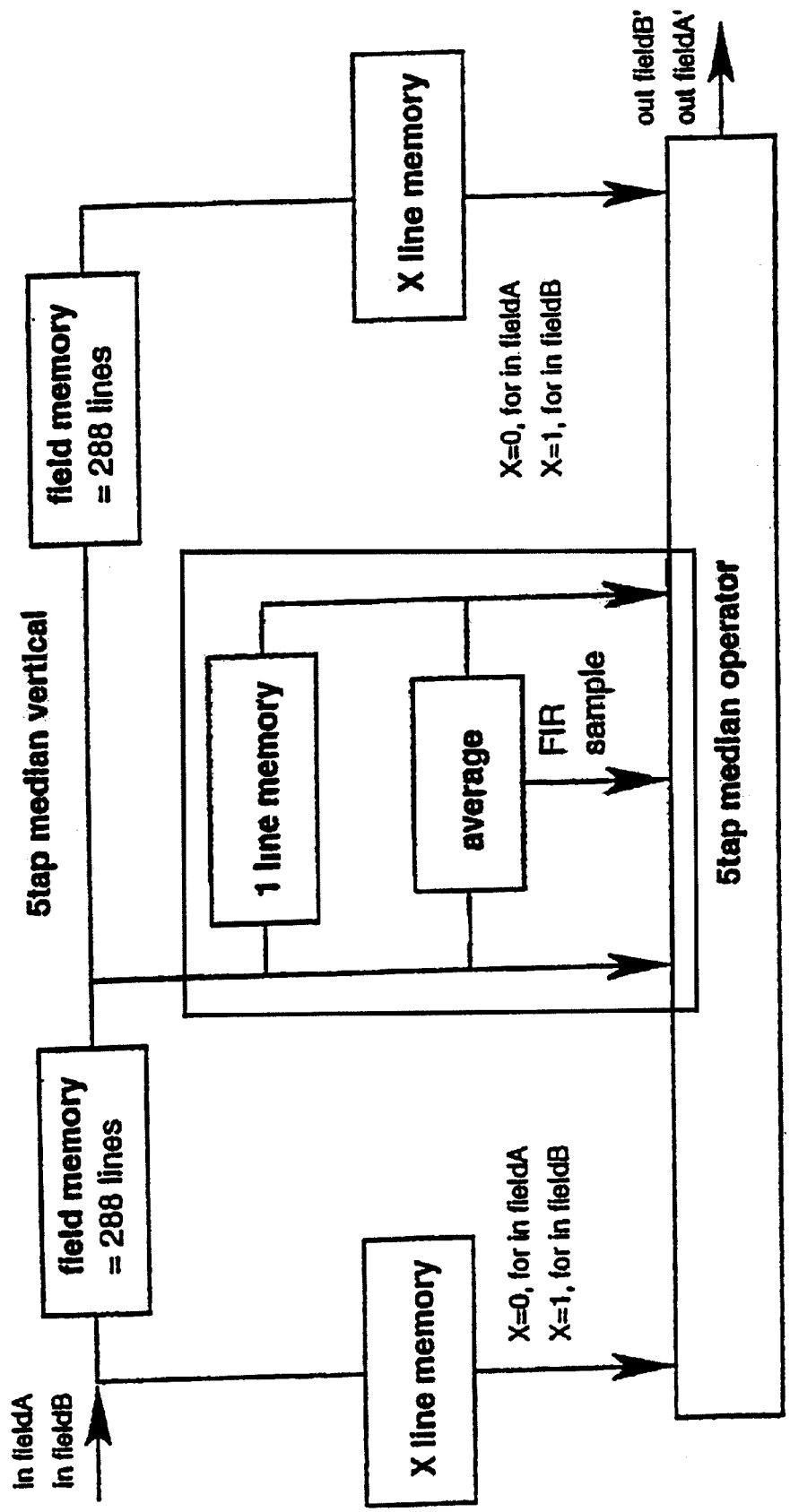
FIG. 5 shows the functionality schemes of a higher mode five-tap median processor requiring two field memories, and three line memories.

On the other hand, as a further sophistication of the IPC module including a five-tap median type filter (see FIG. 5 and line 5 in FIG. 1), edge detection and edge processing could be included in order to improve the performance of the five-tap median filter algorithm component on diagonal edges or variable slope lines (see line 6 in FIG. 1).

Figure 6:
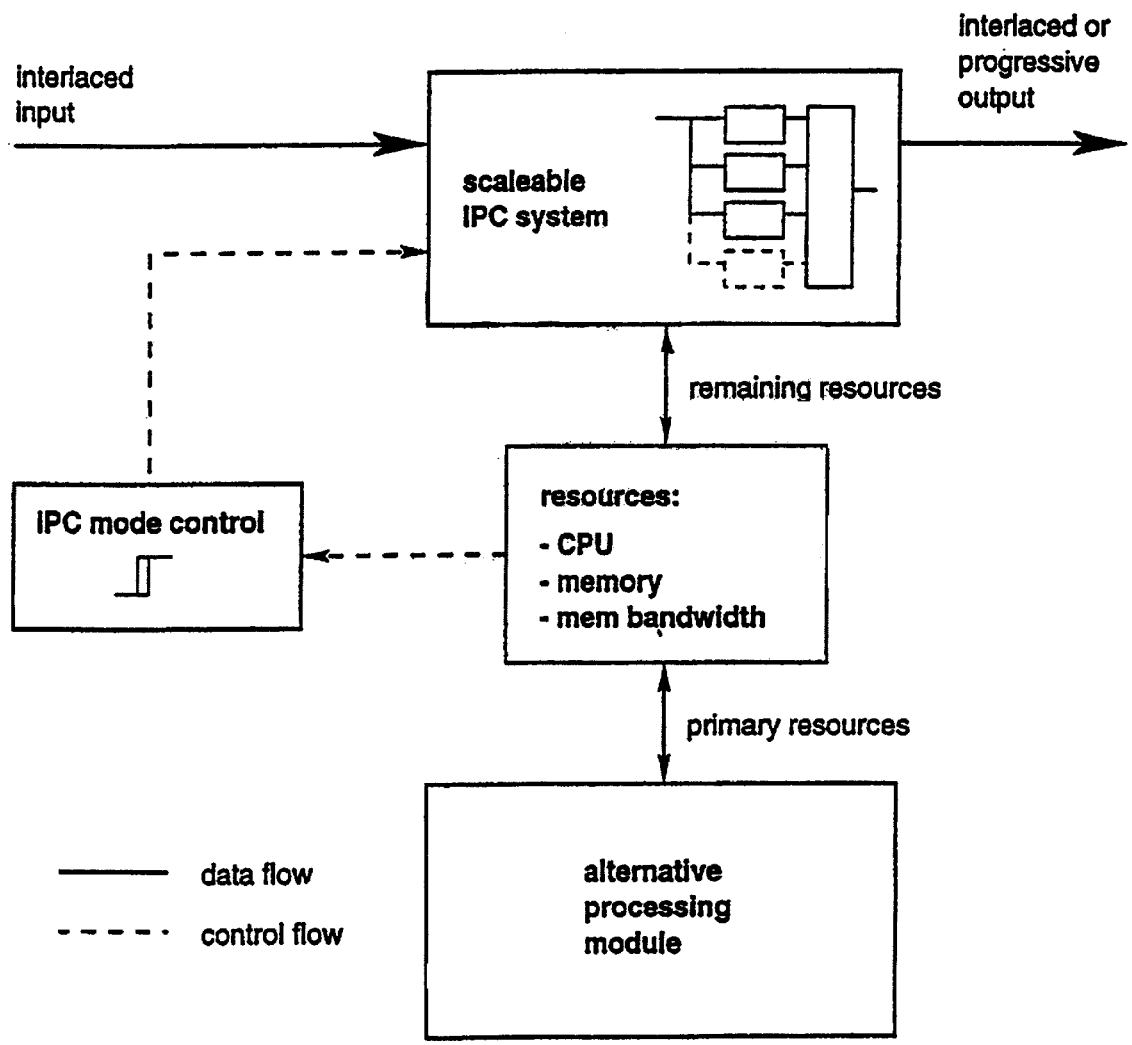
FIG. 6 is an overall functionality block diagram of a resources oriented multimode IPC system integrated into an embracing system with dynamic resource allocation according to the invention.

Every level of the interpolation process requires a certain amount of "processing delay". This delay is defined as follows: It is the delay of incoming fields to the respective matching outgoing and interpolated fields. For example, if field B comes in and field A' (matching A) goes out, then the interpolator has a one field delay. This is important for the merging of source lines with the interpolated lines to generate a progressive frame. This is shown in principle in FIG. 6.

If the algorithm has no field delay, the fields can be merged directly. But if the algorithm has a field delay, i.e. in the case of a three-tap and a five-tap median operator, then the source field has to be delayed also for synchronization purposes. The appropriate delays can be seen in FIG. 2 to FIG. 7 in which the "center of filter operation" or the "center of gravity of the interpolator" is underlayed and framed by a shaded area in each case.

As mentioned above, the new algorithm according to the invention is scaleable within several levels, here called "modes" with an increasing computational complexity and increasing resource requirements. The level of interpolation depends on the available resources which are not used by alternative processing modules. This is shown in the embracing system with dynamic resource allocation depicted in FIG. 6. The shown block "IPC mode control" can be implemented as a decision table for which a principle example device has a lookup table for IPC mode control as shown in FIG. 1. Five different levels are shown in FIG. 1 with the respective hardware requirements for lines 2 to 5 shown in FIGS. 2 to 5.

1. Lowest level: line repetition only; none of the two major parts is required (line 1 in FIG. 1).

2. Lower level: only a "linear part" is required; linear interpolation and intra-field computation (see line 2 in FIG. 1 and FIG. 2).

3. Medium level: only a "median part" is used, i.e. a three-tap median operator, a one field memory and inter-field computation in consideration of a predecessor field or a successor field, respectively (see lines 3 and 4 in FIG. 1 and FIG. 3 and FIG. 4).

4. Higher level: combination of "linear part" and "median part"; five-tap median operator, two fields memories and inter-field computation (see line 5 in FIG. 1 and FIG. 5).

5. Highest level: combination of "linear part" and "median part" as in level 4, however, additionally edge detection can be implemented to improve the filter performance on diagonal edges and variable slope lines (see line 6 in FIG. 1).

Figure 7:
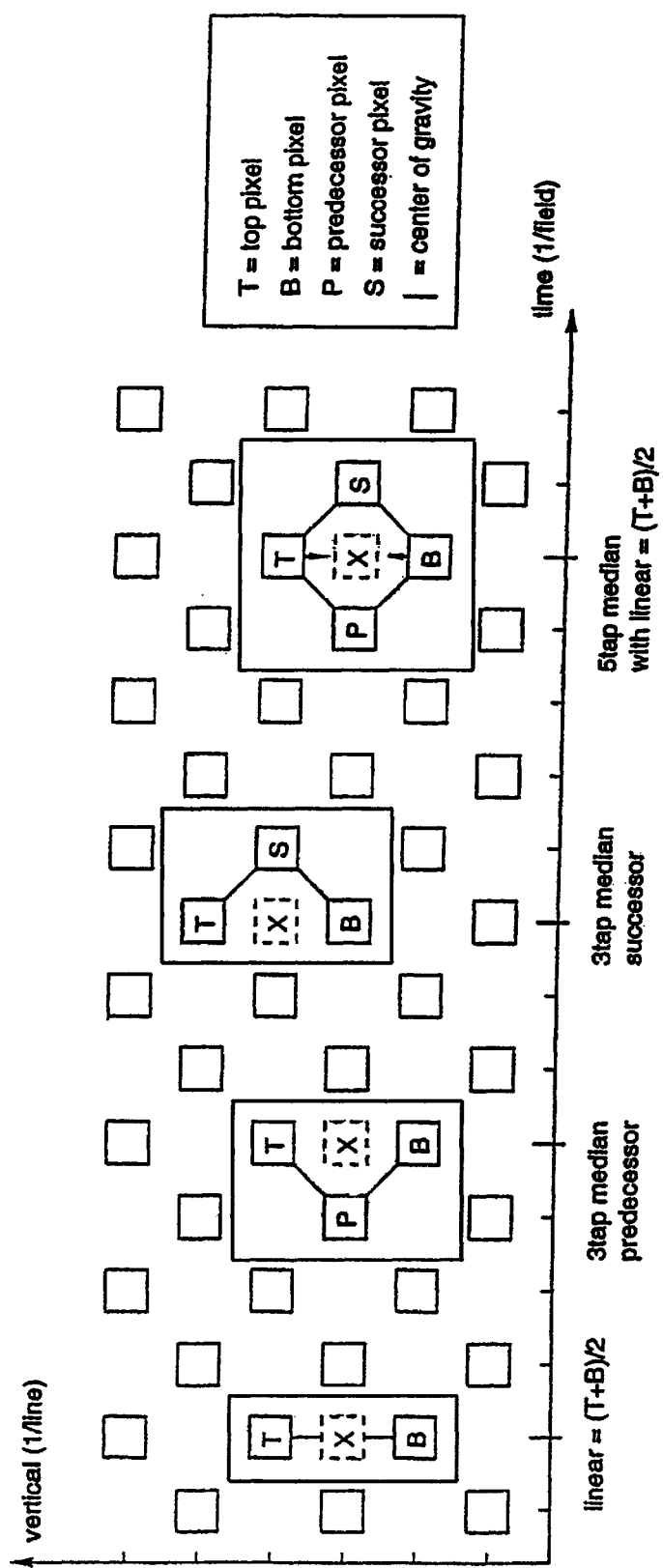
FIG. 7 is a pictural presentation of four different modes for vertical-temporal scan raster with respectively different IPC filter apertures.

For an overview of the respective filter apertures attention is drawn to FIG. 7 in which for each of the four levels shown the respective center of gravity is underlayed and framed by a gray field.

The various levels of the scaleable algorithm according to the invention are explained in further details in the following.

Add 1. Lowest level, i.e. line repetition (see FIG. 1, line 1):

This is the lowest level of the IPC algorithm. Incoming source lines are simply repeated to make up the missing lines to generate a progressive field. Either repetition of the upper line or of the lower line is possible and can change from incoming field to field. No computation and no field memory are needed. The algorithm has no field delay; it represents the lowest quality output and the lowest level, both in terms of output quality and in terms of required system resources.

Add 2. Lower level, i.e. linear interpolation, "linear part" (FIG. 1, line 2 and FIG. 2):

This is the lower level of the IPC algorithm. No field memory but only some computational performance is required. The algorithm has no field delay. A simple example of a linear implementation is, that the missing pixel X' is computed by averaging the respective pixels above and below the missing X' pixel.

Add 3. Medium level, i.e. a three-tap median interpolation, the "median part" (see lines 3 and 4 of FIG. 1 and FIG. 3 and FIG. 4):

For this intermediate level of the IPC algorithm one field memory is required for the interpolation processing. There are two possible ways to implement this algorithm called the "three-tap median predecessor" (see line 3 in FIG. 1 and FIG. 3) and the "three-tap median successor" (see line 4 in FIG. 1 and FIG. 4). The predecessor type has no field delay, whereas the successor type has one field delay. This is the main difference between both implementations. The interpolation results are essentially the same, in terms of visual behaviour. The filter works such that three samples are taken from two successive fields, i.e. current and previous successive fields. The output is the median of:

The pixel (Picture Element) at position X' in the former/latter field X;
the pixel above the position X',
the pixel below the position X'.

It can be seen that pixels are taken from a vertical-temporal plane. That is the reason for a good edge preserving property in the vertical direction.

Add 4. Higher level, i.e. five-tap median interpolation, i.e. the combination of the "linear part" and the "median part" (see line 5 in FIG. 1 and FIG. 5):

In this higher level of the IPC algorithm, two field memories are required for the interpolation process. The algorithm has one field delay. Four samples are taken from three successive fields, the fifth sample is a spatio-temporal linear filter sample. If the field to be interpolated is denoted as "field B", the predecessor is "field A" and the successor is "field C". The output is the median of:

pixel P at position X' from the predecessor field A,
pixel S at position X' from the successor field C,
pixel T on top of (above) position X' from the current field,
pixel B of below position X' from current field B, and
spatio-temporal linear filter sample.

The linear sample can be computed in a simple way, such as averaging the pixels T and B. This equals the linear interpolation estimate in the linear part.

Due to the vertical emphasis (3 out of 5 pixels), a stronger weight is put on the spatial domain. A better motion rendition is achieved with less temporal artifacts. Also, a reduced emphasis is put onto spatial resolutions.

Figure 9:
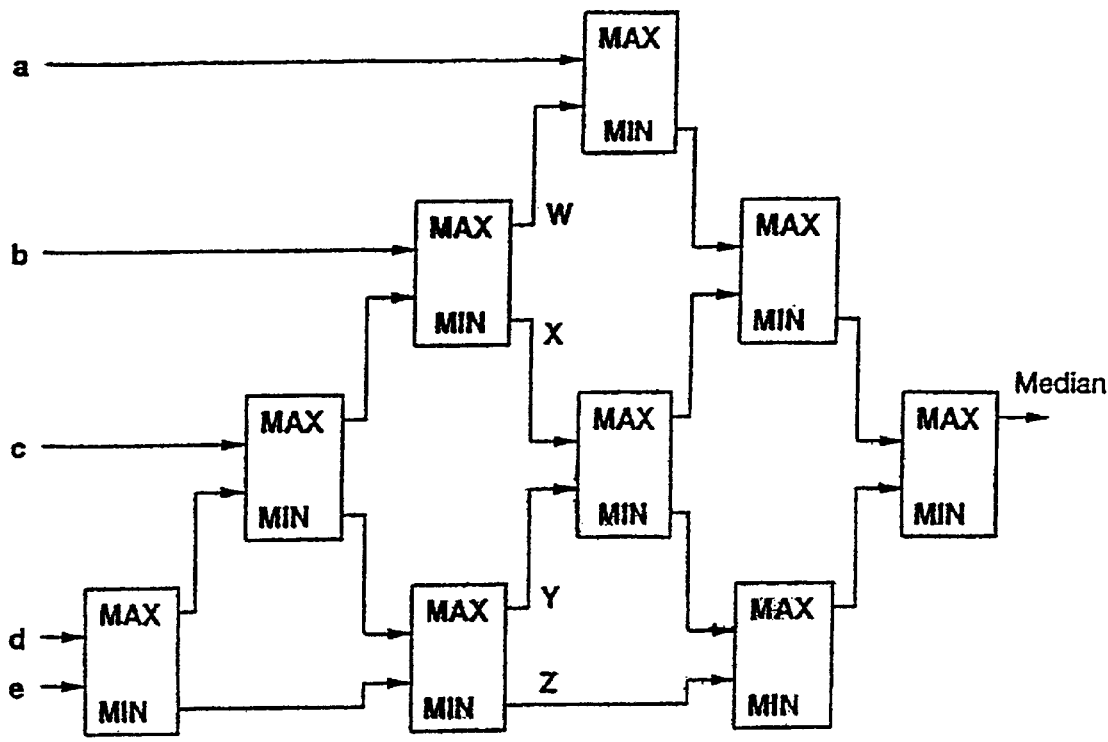
FIG. 9 shows an implementation example for the basic version of a five-tap median algorithm.
Figure 10:
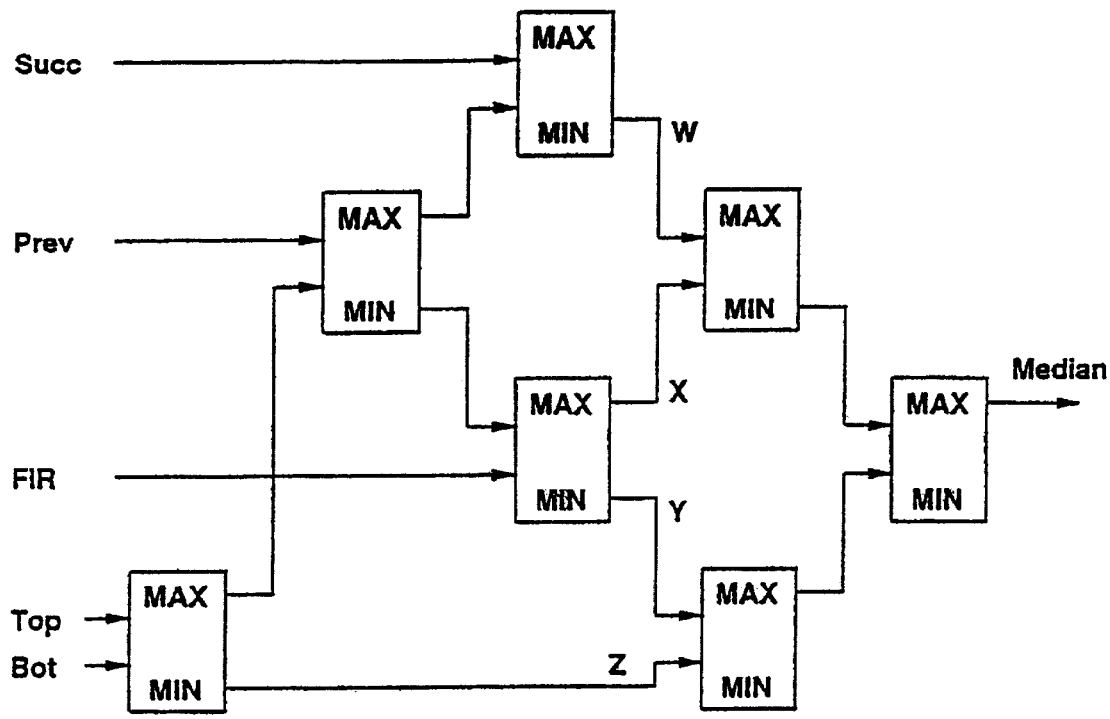
FIG. 10 depicts a modified implementation of a five-tap median algorithm using the output of a FIR interpolation.

For a generic implementation of five-tap median operators the readers attention is drawn to FIG. 9 showing a basic version of a five-tap median algorithm as implemented according to the invention. Specifically for a two-tap average interpolator with a five-tap median interpolator please refer to the modified version of a five-tap median algorithm as shown in FIG. 10.

The basic version of a five-tap median algorithm as exemplified in FIG. 9 results in the median out of five input values. As shown by respective functional equations, the idea is to sort out the maximum three times. The third maximum will be the median value.

As to the modified version of the five-tap median algorithm shown in FIG. 10, again the median is generated on the basis of five values, however, different from FIG. 8, the knowledge about the linear part is used as one input value. In the specific example of FIG. 10—which is not to be understood as a limitation for the linear interpolation—the value which is built out of the top and the bottom value is between those and is the average as shown by the "assumption".

Add 5. Highest level, the combination of a five-tap median interpolation and edge detection (see line 6 in FIG. 1):

In order to improve the median performance of the aforementioned higher level interpolation, a diagonal edge detector is additionally included.

The main advantages of the invention over comparable State-of-the-Art IPC algorithms and IPC implementation structures are the following:

a scaleable IPC structure is available in terms of system resources, i.e. CPU, memory requirements, memory bandwidth, etc., by applying various distinct IPC algorithms;

a simple IPC filter algorithm with small, local filter apertures is provided;

small resource requirements, compared to motion adaptive or motion compensated algorithms;

good performance, both on static image contents and also on moving objects;

an overall robust algorithm is provided for all image contents.

The scaleable algorithm according to the invention is configurable in hardware at the production time or as the case may be as a software configuration at system runtime. The multilevel scaleable algorithm of the invention provides a flexible adaptation for variable resource requirements or availability with the understanding that more available resources provide for a better output quality.

Prior Art Literature:

| | |
|---|---|
| Lit. [1] Gerard de Haan et al.; | True-motion estimation with 3D recursive search block matching; IEEE Transactions on Circuits and Systems for Video Technology, October 1993 p. 368–379. |
| Lit. [2] Oeistaemoe and Y. Neuvo; | A Motion Insensitive Method for Scan Rate Conversion and Cross Error Cancelation; IEEE Transactions on Consumer Electronics, August 1991, p. 296–300. |
| Lit. [3] Christian Hentschel: | Bewegungsdetektion in Videosystemen mit Zeilensprungabtastung: Rundfunktechnische Mitteilungen, Heft 4, 1994; |
| Lit. [4] Gerard de Haan et al.; | An Evolutionary Architecture for Motion-Compensated 100 Hz Television; IEEE Transactions on Circuits and Systems for Video Technology, June 1995; p. 207–217. |
| Lit. [5] US 5 483 288 | |

What is claimed is:

1. A scan raster conversion system for converting an interlaced source signal into a progressive output signal, comprising:

various system resources comprising at least a processor and a memory;

an interpolation system for converting said interlaced source signal into said progressive output signal using a plurality of interpolation modules; each interpolation module corresponding to a different interpolation mode that respectively performs a different interpolation algorithm; each interpolation module dynamically accessing a part of said various system resources to perform the corresponding interpolation algorithm; and mode control means for selecting one of said plurality of interpolation modules on the basis of the availability of said various system resources to perform the corresponding interpolation algorithm.

2. The scan raster conversion system according to claim 1, wherein the availability of the various system resources is dependent upon the computational power of said processor, the available space in said memory, the bandwidth of said memory, and/or the system power.

3. The scan raster conversion system according to claim 1, wherein said plurality of interpolation modules includes at least a linear interpolator and a ranking filter interpolator.

4. The scan raster conversion system according to claim 3, wherein said ranking filter interpolator uses a three-tap median filter.

5. The scan raster conversion system according to claim 3, wherein said ranking filter interpolator uses a five-tap median filter.

6. The scan raster conversion system according to claim 3, wherein said linear interpolator uses a finite impulse response (FIR) filter.

7. A method of converting an interlaced source signal into a progressive output signal, comprising the steps of:

inputting said interlaced source signal;

selecting one of a plurality of interpolation modes on the basis of the availability of various system resources to perform a corresponding interpolation algorithm; the various system resources comprising at least a processor and a memory; and converting said interlaced source signal into said progressive output signal using the selected interpolation mode.

8. The method according to claim 7, wherein the availability of the various system resources is dependent upon the computational power of said processor, the available space in said memory, the bandwidth of said memory, and/or the system power.

9. The method according to claim 7, wherein said plurality of interpolation modes includes at least a linear filter mode and a ranking filter mode.

10. The method according to claim 9, wherein said ranking filter mode uses a three-tap median filter or a five-tap median filter.

11. The method according to claim 10, wherein said ranking filter mode further uses an edge interpolation filter.

12. The method according to claim 7, wherein said selecting step further selects one of said plurality of interpolation modes on the basis of a decision table.

13. The method according to claim 7, wherein said plurality of interpolation modes comprises:

a first mode for performing a line repetition algorithm;

a second mode for performing a linear interpolation algorithm;

a third mode for performing a three-tap median filter algorithm;

a fourth mode for performing a combination of said linear interpolation algorithm and a five-tap median filter algorithm; and a fifth mode for performing a combination of said linear interpolation algorithm, said five-tap median filter algorithm, and an edge interpolation algorithm.

* * * * *